(12) United States Patent
Cohen

(10) Patent No.: US 7,098,631 B2
(45) Date of Patent: Aug. 29, 2006

(54) METHOD AND CONTROL CIRCUIT FOR POWER FACTOR CORRECTION

(75) Inventor: Isaac Cohen, Dix Hills, NY (US)

(73) Assignee: Lambda Americas, Inc., San Diego, CA (US)

( * ) Notice: Subject to any disclaimer, the term of this patent is extended or adjusted under 35 U.S.C. 154(b) by 0 days.

(21) Appl. No.: 10/709,553

(22) Filed: May 13, 2004

(65) Prior Publication Data

US 2005/0253565 A1    Nov. 17, 2005

(51) Int. Cl.
  *G05F 1/10*    (2006.01)
  *G05F 1/40*    (2006.01)
(52) U.S. Cl. .................... 323/222; 323/285; 323/205
(58) Field of Classification Search ................ 323/222, 323/285, 283, 284, 205
  See application file for complete search history.

(56) References Cited

U.S. PATENT DOCUMENTS

| | | | |
|---|---|---|---|
| 5,804,950 A | 9/1998 | Hwang et al. | |
| 5,867,379 A * | 2/1999 | Maksimovic et al. | ......... 363/89 |
| 6,307,361 B1 | 10/2001 | Yaakov et al. | |
| 6,657,417 B1 * | 12/2003 | Hwang | ........................ 323/222 |
| 6,693,411 B1 * | 2/2004 | Bub et al. | ..................... 323/282 |

OTHER PUBLICATIONS

Gegner et al., "Linear Peak Current Mode Control: A Simple Active Power Factor Correction Control Technique for Continuous Conduction Mode," 1996 IEEE, pp. 196-202.
Infineon Technologies, CCM-PFC ICE1PCS01 ICE1PCS01G, Standalone Power Factor Correction (PFC) Controller in Continuous Conduction Mode (CCM), Datasheet, V1.1, May 28, 2003.
Green Power Technologies Ltd., "Toward a Plug-and-Play Approach for Active Power Factor Correction," Published in Power Electronics EUROPE, Issue 1, 2004, 9 pages, no month.
Green Power Technologies Ltd., "GPTC110XX Continuous Current Mode Power Factor Correction Controllers Family—Data Sheet, Applications Note," www.g-p-t.com; Admitted Prior Art, 24 pages, no date.

* cited by examiner

*Primary Examiner*—Shawn Riley
(74) *Attorney, Agent, or Firm*—Myers Bigel Sibley & Sajovec PA (57) ABSTRACT

A power factor correcting converter includes a control circuit that modulates on and off intervals of a power switch so that a momentary input current of the converter is directly proportional to both a momentary value of an input voltage of the converter and to a momentary value of a current absorbed by a load coupled to an output of the converter.

4 Claims, 6 Drawing Sheets

METHOD AND CONTROL CIRCUIT FOR POWER FACTOR CORRECTION

BACKGROUND OF INVENTION

This invention applies to the field of control of switching power converters and more particularly to the control of converters that absorb from their input voltage source a current that is directly proportional to the momentary value of voltage.

Converters operating in this fashion are often used to perform what is known as power factor correction.

PRIOR ART

U.S. Pat. Nos. 5,804,950 and 6,307,361B1 show control methods for power factor correction converters that do not require sensing of the instantaneous value of the input voltage of the converter.

A common disadvantage of the control methods of the prior art is that loop gain of the control circuits is a square function of the input voltage.

This gain variation in conjunction with the need to limit the gain in order to achieve low harmonic distortions will adversely affect the dynamic performance of control circuits based on the algorithms of the prior art.

SUMMARY OF INVENTION

It is the goal of the present invention to create a simple method for a control circuit for power factor correction converters that does not require sensing of the instantaneous value of the input voltage of the converter, provides low harmonic distortions and good dynamic performance.

The present invention uses the output current of a power factor correction converter to provide the reference signal for Valley Current Mode control of its input current, thereby providing feed forward regulation of the output voltage against changes in the output load.

In addition, instead of operating the Valley Current Mode control circuit at the traditional fixed frequency, the frequency of operation is made directly proportional to the RMS or average value of the input voltage of the converter.

As a result, the dependence of the loop gain on the input voltage is significantly reduced and the dynamic performance of the converter is improved.

The gain compensation is achieved without the use of an explicit divider.

For converter topologies with no direct access to the converter's input voltage, a signal directly proportional to the average or the peak of the input voltage peak value can be produced by sensing and rectifying the voltage that develops across an appropriate magnetic element during the conduction of the converter's switches.

Finally, complete correction for changes in the input voltage can be implemented by adding one division operation to the basic algorithm.

DETAILED DESCRIPTION

The operation of the control circuit will be described in conjunction with a boost converter (FIG. 1), consisting of boost inductor 1, power switch 2, output diode 3 and the output filter capacitor 4. The converter extracts power from a input voltage source 13 and delivers it to a load 14.

Figure 1:
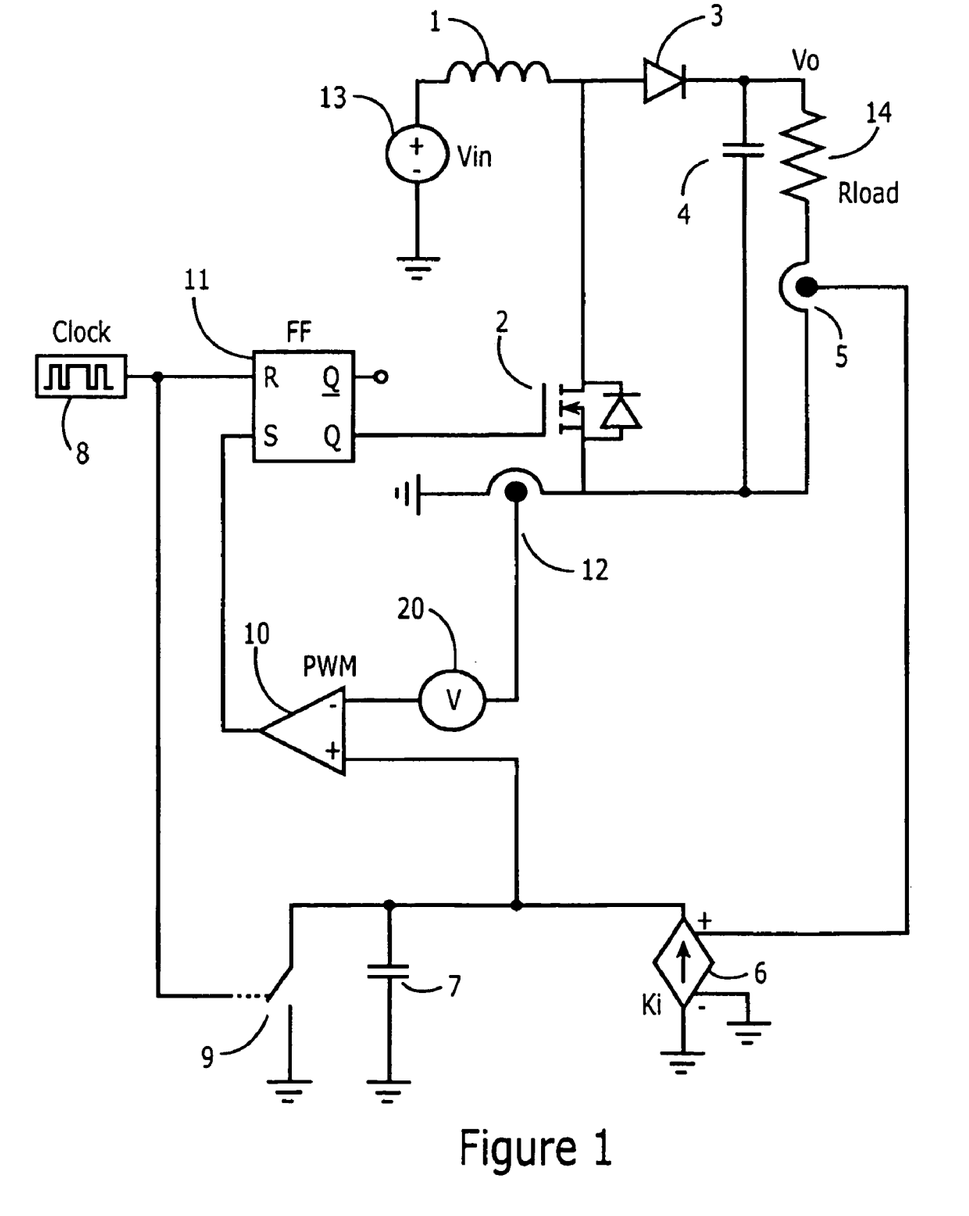
FIG. 1 shows a boost converter Power Factor Correction converter controlled by a Valley Current mode controller with load current feed forward

A current sensor 5 generates a signal directly proportional to the output current of the PFC converter. This signal is applied to V/I converter 6 that converts it to a current that charges capacitor 7 to create a saw tooth signal that is reset every time a pulse from clock 8 turns switch 9 momentarily on.

Current sensor 12 generates a signal directly proportional to the input current. This signal is compared to the saw tooth signal by the PWM comparator 10. Comparator 10 sets the RS flip-flop 11 when the value of the current signal drops below the value of the ramp. Flip-flop 11 provides the drive for the power switch 2; in order to assure that no pulses are generated when the output current of the boost converter is near zero, an offset voltage 20 may be added to an input of comparator 10.

The timing pulses generated by clock 8 also reset flip-flop 11.

Comparator 10 and SR flip-flop 11 form a Valley Current Mode controller that, if the AC ripple current in inductor 1 is small compared to the instantaneous current, will cause the input current of the boost converter to be proportional to the momentary value of the input voltage 13 and to the amplitude of the saw tooth.

As the amplitude of the saw tooth is directly proportional to the output load current, the input current of the converter will be also directly proportional to its output current. This will cause the input power to track the output power, thereby regulating the output voltage against changes caused by variation in the output load.

Figure 2:
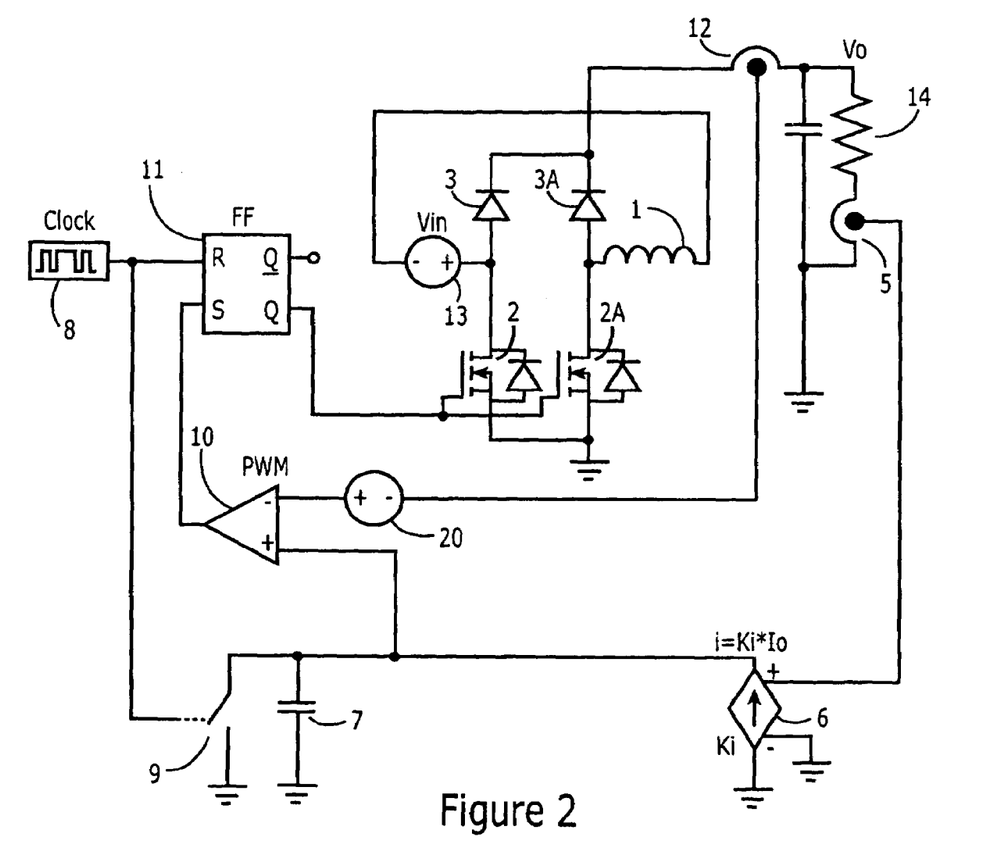
FIG. 2 shows a boost derived Power Factor Correction converter controlled by a Valley Current mode controller with load current feed forward

In some boost converter topologies that may be used for power factor correction, the input current is not readily accessible, but since the Valley Current Mode control requires current information only during the time the power switch(s) is OFF, the current flowing thorough the output diode(s) can be measured instead. An example of the present invention applied to such topology is shown in FIG. 2.

The proportionality between the momentary value of the input voltage and the input current is the basis for the capability of the boost converter controlled by the above circuit to provide power factor correction or, more accurately, allow the converter to draw power from the input voltage source without generating harmonics.

At the same time, this linear relationship between the input voltage and current will cause the average input power to increase as the square of the input voltage, causing the average output voltage to become proportional to the square of the half wave average or RMS ("long term") value of the input voltage.

It follows from the above that while proportionality between the momentary value of input voltage and current is desirable and necessary for the purpose of power factor correction, the proportionality of the input current to the "long term" value of the input voltage has a severe detrimental effect on the line regulation of the output voltage and is therefore undesirable.

In one embodiment (FIG. 3), the present invention mitigates this detrimental effect; another embodiment (FIG. 5) eliminates it entirely.

Figure 3:
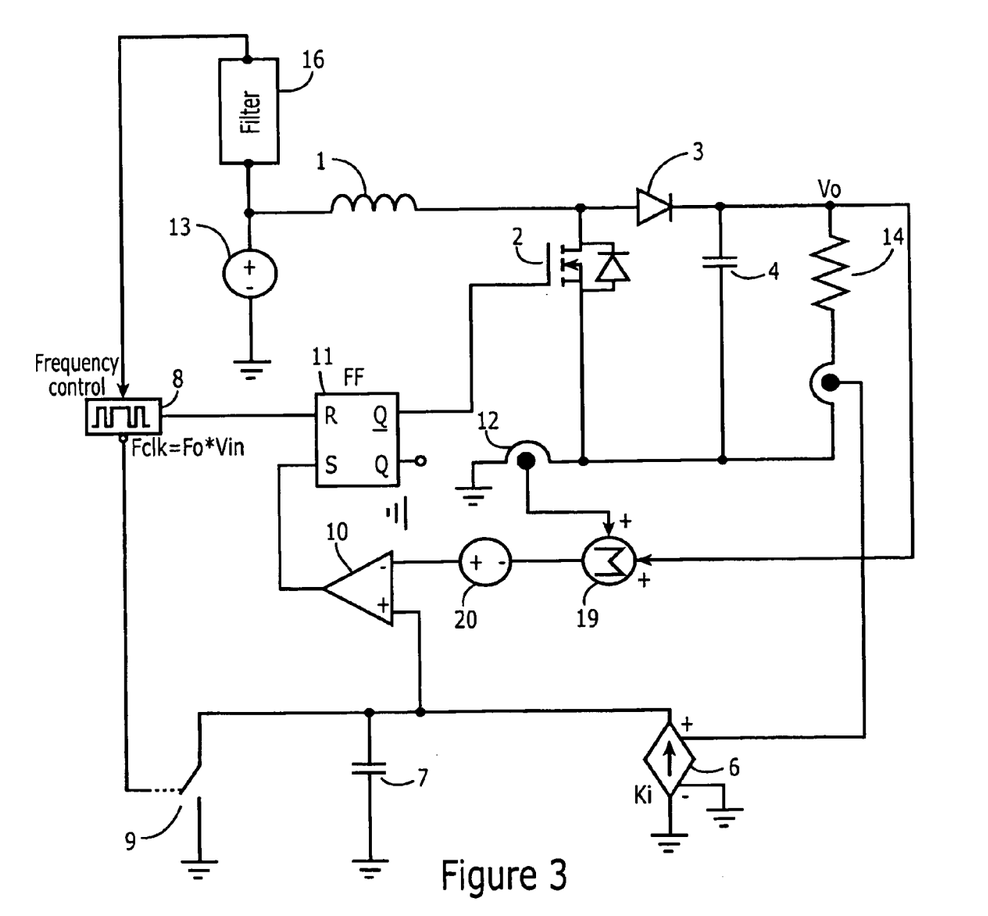
FIG. 3 shows a boost converter Power Factor Correction converter controlled by a Valley Current mode controller with load current feed forward and partial input voltage feed forward

Referring to FIG. 3, a filter (block 16) receives the input voltage 13 and generates a signal proportional to the RMS or half wave average value of the input voltage. This signal is applied to a voltage to frequency converter 8 that generates the clock pulses.

As a result, the frequency of the clock will be proportional to RMS or half wave average value of the input voltage.

Since the input current of the converter is proportional to the amplitude of the saw tooth waveform appearing on capacitor 7 and this amplitude is inversely proportional to the clock frequency, the half wave average or RMS value of the input current of the converter will become independent of the RMS or half wave average value of the input voltage.

The result of controlling the converter according to this algorithm is that its output voltage will be proportional to its input voltage.

The embodiment shown in FIG. 3 may be used as is (having the output voltage proportional to the input voltage may actually be desirable in some applications).

Figure 4:
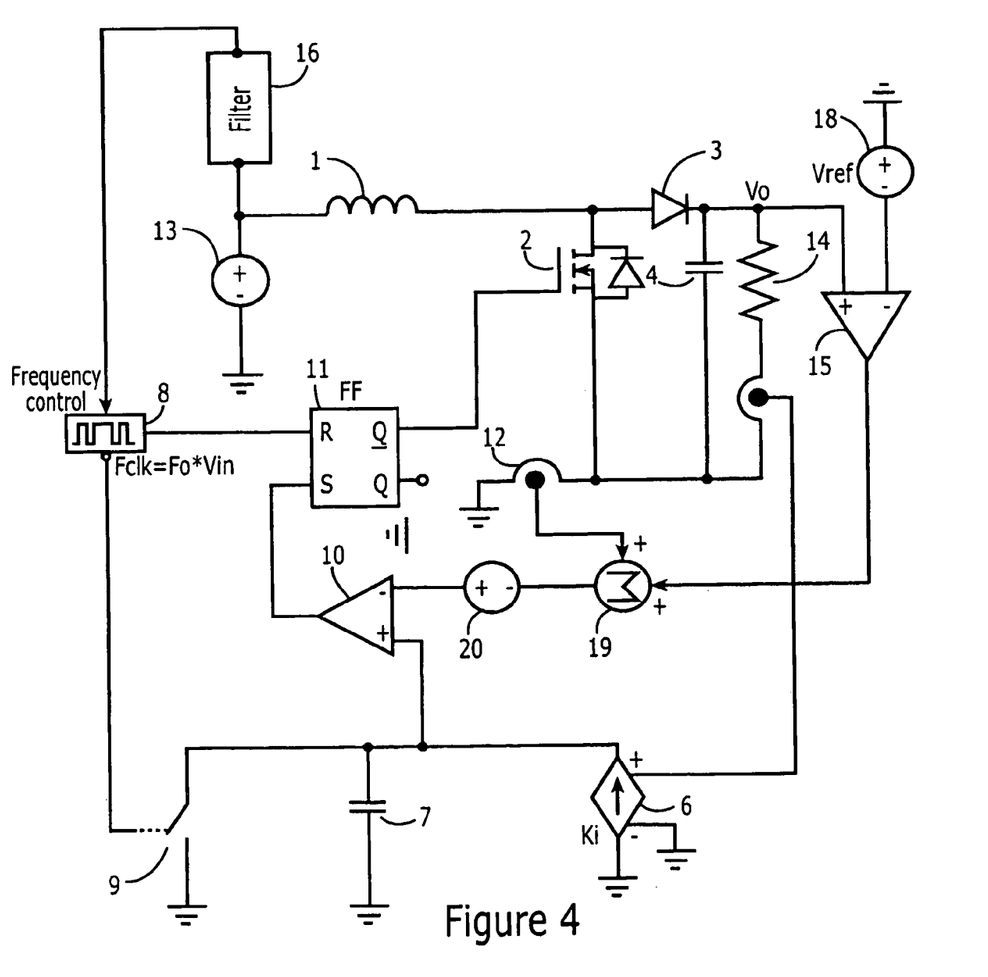
FIG. 4 shows a boost converter Power Factor Correction converter controlled by a Valley Current mode controller with load current feed forward, partial input voltage feed forward and closed loop output voltage control

Adding a relatively slow acting close loop to the basic embodiment of FIG. 3 can regulate the output voltage (FIG. 4).

An amplifier 15 compares the output voltage of the converter to reference 18 and generates a corrective signal that can be used to affect the duty cycle of the converter in order to regulate output voltage. In FIG. 4 common this signal is added to the input current signal generated by the current sensor 12. It would be apparent to those versed in the art that as the embodiment of FIG. 4 may actually be implemented with a variety of how long and/or digital means, it to my be more convenient to generate the corrective signal in different ways and to inject it a different in the circuit in order to obtain the desired regulation.

In the embodiment of FIG. 3, the open loop gain of the voltage regulation circuit varies linearly with the input voltage, so the compensation of loop is facilitated and the dynamic performance is improved in comparison to the prior art control methods, for which the gain varies as the square of the input voltage.

It should be mentioned that in case of topologies (as the example of FIG. 2) that do not provide direct access to the input voltage, a signal proportional to the average value of the input voltage can be synthesized by selective rectification and filtration of the pulsed voltage appearing on a winding placed on the equivalent of the boost inductor(s) (inductor 1 in FIG. 2) when the equivalent of the boost switch 2 is on (switches 2 and 2A in FIG. 2).

"Complete" input voltage feed forward correction can be accomplished by making the "long term" value of the input current of the converter inversely proportional to the "long term" value of the input voltage.

This is accomplished a by adding a division or multiplication operation to the embodiment of FIG. 4.

Figure 5:
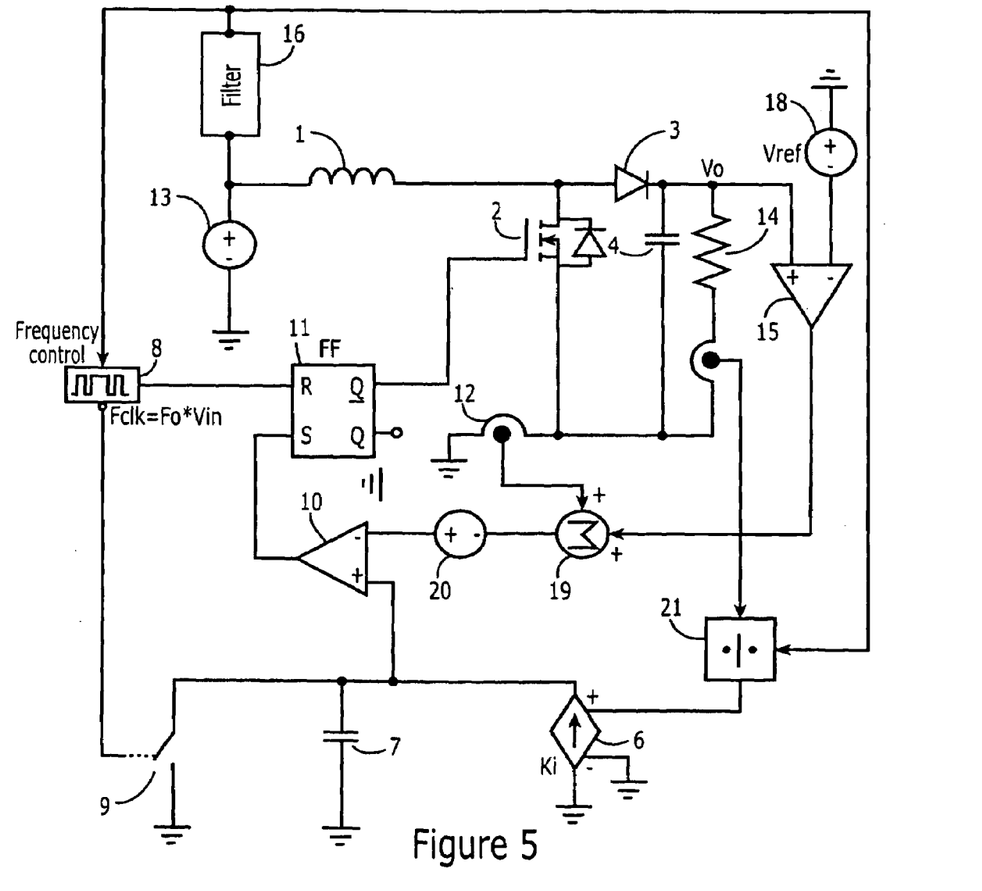
FIG. 5 shows a boost converter Power Factor Correction converter controlled by a Valley Current mode controller with load current feed forward, full input voltage feed forward and closed loop output voltage control

The preferred embodiment of the "complete" input voltage feed forward is shown in FIG. 5, where divider 21 divides the signal applied to the voltage to current converter 6 by the half wave average or RMS value of the input voltage produced by filter 16 (same functionality as filter 16 discussed previously).

Figure 6:
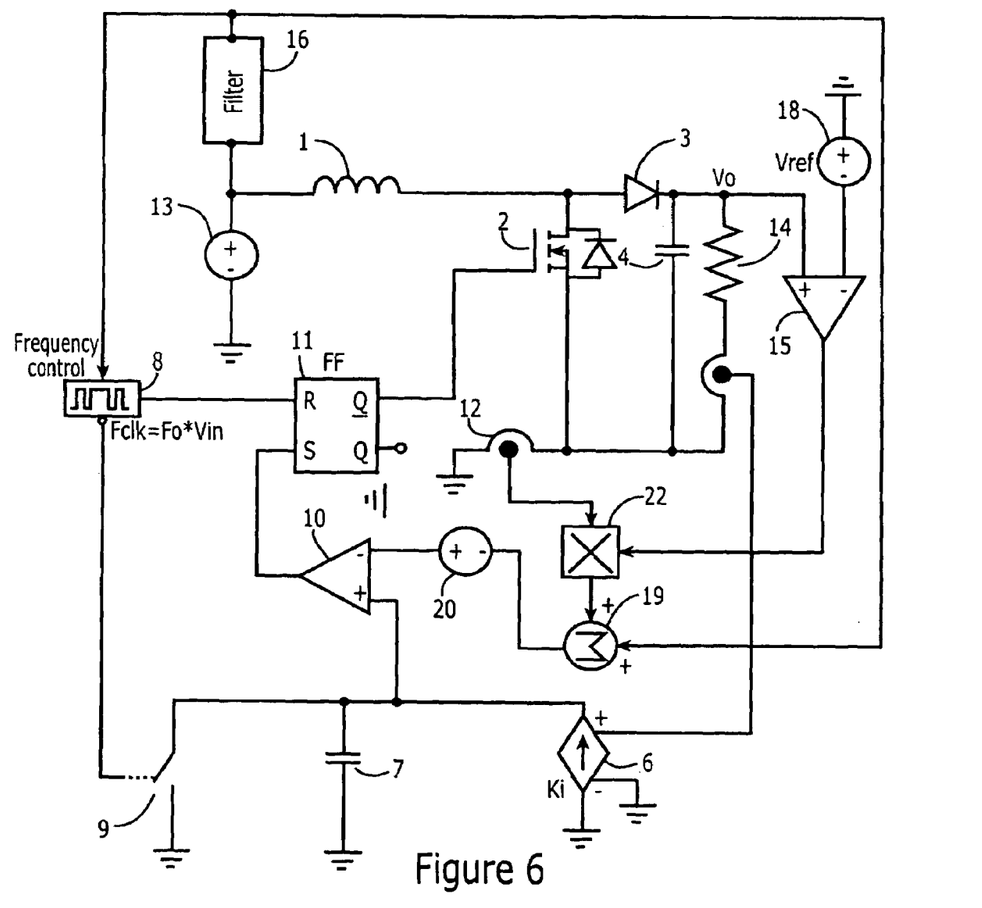
FIG. 6 shows a boost converter Power Factor Correction converter controlled by a Valley Current mode controller with load current feed forward, closed loop output voltage control and an equivalent embodiment of the full input voltage feed forward.

An equivalent embodiment of the "complete" input voltage feed forward is shown in FIG. 6, were multiplier 22 is used to multiply the signal generated by the current sensor 12 by the voltage produced by filter 16.

The "complete" feed forward correction may be used to further facilitate the compensation and improve the dynamic performance of the voltage control loop.

The invention claimed is:

1. A power factor correcting converter comprising:
    an input configured to be connected to an input voltage source;
    an output configured to be connected to an output circuit including at least one filter capacitor and a load;
    a control circuit;
    at least one inductor;
    at least one power switch being turned on and off by the control circuit so that the input voltage source is connected across the at least across one inductor when the power switch is on;
    at least one rectifier that connects the at least one inductor between the input voltage source and the output circuit so inductor current flows out from the input voltage source and into the output circuit when the power switch is off,
    the control circuit modulating on and off intervals of the power switch so a momentary input current at the input of the converter is directly proportional to both a momentary value of an input voltage at the input of the converter and to a momentary value of a current of the load, the control circuit comprising:
    a SR flip-flop that in a set state turns the power switch on;
    an integrator;
    a clock generator that produces a fixed frequency train of narrow pulses for resetting the flip-flop and the integrator, a saw tooth voltage generated by the integrator by integrating a signal proportional to the current of the load, the integrator being reset by the pulses from the clock generator so an amplitude of the saw tooth voltage is proportional to the current of the load and inversely proportional to the frequency of the clock pulses; and
    a comparator that compares the saw tooth voltage to a signal proportional to a current delivered to the output circuit, the comparator setting the SR flip-flop when a value of the current delivered to the output circuit drops below a value of the saw tooth voltage.

2. A power factor correcting converter comprising:
    an input configured to be connected to an input voltage source;
    an output configured to be connected to an output circuit including at least one filter capacitor and a load;
    a control circuit;
    at least one inductor;
    at least one power switch being turned on and off by the control circuit so that the input voltage is connected across the at least across one inductor when the power switch is on;
    at least one rectifier that connects the inductor between the input voltage source and the output circuit so inductor current flows out from the input voltage source and into the output circuit when the power switch is off, the control circuit modulating the on and off intervals of the power switch so a momentary input current at the input of the converter is directly proportional to both a momentary value of an input voltage at the input of the converter and a momentary value of a current of the load and is independent of an average or RMS value of the input voltage of the converter, the control circuit comprising:

a SR flip-flop that in a set state turns the power switch on;

an integrator;

a clock generator that produces a train of narrow pulses for resetting the flip-flop and the integrator, the frequency of the pulses being proportional to a half wave average or RMS value of the input voltage of the converter, a saw tooth voltage generated by the integrator by integrating a signal proportional to the current of the load, the integrator being reset by the pulses from the clock generator so an amplitude of the saw tooth voltage is proportional to the current of the load and inversely proportional to the frequency of the clock pulses; and a comparator that compares the saw tooth voltage to a signal proportional to a current delivered to the output circuit, the comparator setting the SR flip-flop when a value of the current delivered to the output circuit drops below a value of the saw tooth voltage.

3. A power factor correcting converter comprising:

an input configured to be connected to an input voltage source;

an output configured to be connected to an output circuit comprising at least one filter capacitor and a load;

a control circuit;

at least one inductor;

at least one power switch being turned on and off by the control circuit so that the input voltage source is connected across the at least across one inductor when the power switch is on;

at least one rectifier that connects the at least one inductor between the input voltage source and the output circuit so inductor current flows out from the input voltage source and into the output circuit when the power switch is off, the control circuit modulating on and off intervals of the power switch so a momentary input current at the input of the converter is directly proportional to both a momentary value of an input voltage at the input of the converter and to a momentary value of a current of the load and is inversely proportional to an average or RMS value of the input voltage of the converter, wherein the control circuit comprises:

an SR flip-flop that in a set state turns the power switch on;

an integrator;

a clock generator that produces a train of narrow pulses for resetting the flip-flop and the integrator, a frequency of the pulses being proportional to a half wave average or RMS value of the input voltage of the converter, a saw tooth voltage generated by the integrator by integrating a signal directly proportional to the current of the load and inversely proportional to the average or the RMS value of the input voltage of the converter, the integrator being reset by the pulses from the clock generator so an amplitude of the saw tooth voltage is proportional to the current of the load and inversely proportional to the frequency of the clock pulses; and a comparator that compares the saw tooth voltage to a signal proportional to a current delivered to the output circuit, the comparator setting the SR flip-flop when a value of the current delivered to the output circuit drops below a value of the saw tooth voltage.

4. A power factor correcting converter comprising:

an input configured to be connected to an input voltage source;

an output configured to be connected to an output circuit comprising at least one filter capacitor and a load;

a control circuit;

at least one inductor;

at least one power switch being turned on and off by the control circuit so that the input voltage source is connected across the at least one inductor when the power switch is on;

at least one rectifier that connects the at least one inductor between the input voltage source and the output circuit so inductor current flows out from the input voltage source and into the output circuit when the power switch is off, the control circuit modulating on and off intervals of the power switch so a momentary input current at the input of the converter is directly proportional to both a momentary value of an input voltage at the input of the converter and to a momentary value of a current of the load, the control circuit comprising:

an SR flip-flop that in a set state turns the power switch on;

an integrator;

a clock generator that produces a fixed frequency train of narrow pulses for resetting the flip-flop and the integrator, a saw tooth voltage generated by the integrator by integrating a signal proportional to the current of the load and inversely proportional to a square of an average or RMS value of the input voltage of the converter, the integrator being reset by the pulses from the clock generator so an amplitude of the saw tooth voltage is proportional to the current of the load and inversely proportional to the frequency of the clock pulses and inversely proportional to a square of the average or RMS value of the input voltage of the converter; and a comparator that compares the saw tooth voltage to a signal proportional to a current delivered to the output circuit, the comparator setting the SR flip-flop when a value of the current delivered to the output circuit drops below a value of the saw tooth voltage.

* * * * *

UNITED STATES PATENT AND TRADEMARK OFFICE
CERTIFICATE OF CORRECTION

| | | |
|---|---|---|
| PATENT NO. | : 7,098,631 B2 | Page 1 of 1 |
| APPLICATION NO. | : 10/709553 | |
| DATED | : August 29, 2006 | |
| INVENTOR(S) | : Isaac Cohen | |

It is certified that error appears in the above-identified patent and that said Letters Patent is hereby corrected as shown below:

Column 4, line 26, please delete the second occurrence of "across."
Column 4, line 64, please delete the second occurrence of "across."
Column 5, line 38, please delete the second occurrence of "across."

Signed and Sealed this

Fifth Day of December, 2006

JON W. DUDAS
*Director of the United States Patent and Trademark Office*